United States Patent
Hyun et al.

(10) Patent No.: US 6,912,056 B2
(45) Date of Patent: Jun. 28, 2005

(54) APPARATUS AND METHOD FOR MEASURING EACH THICKNESS OF A MULTILAYER STACKED ON A SUBSTRATE

(75) Inventors: Pil-Sik Hyun, Suwon-si (KR); Sun-Jin Kang, Suwon-si (KR); Sang-Kil Lee, Suwon-si (KR); Kyung-Ho Jung, Incheon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 10/914,149

(22) Filed: Aug. 10, 2004

(65) Prior Publication Data

US 2005/0041255 A1 Feb. 24, 2005

(30) Foreign Application Priority Data

Aug. 18, 2003 (KR) ................................ 10-2003-0056961

(51) Int. Cl.[7] .............................................. G01B 11/28
(52) U.S. Cl. ................... 356/630; 356/369; 250/559.27
(58) Field of Search .................. 356/630, 73, 367–369; 250/559.19, 559.27, 559.28, 559.04

(56) References Cited

U.S. PATENT DOCUMENTS

| | | | | |
|---|---|---|---|---|
| 5,457,727 A | * | 10/1995 | Frijlink .......................... 378/73 |
| 5,604,581 A | * | 2/1997 | Liu et al. ........................ 356/73 |
| 5,784,167 A | * | 7/1998 | Ho ................................ 356/369 |
| 6,449,037 B2 | * | 9/2002 | Jun et al. .................... 356/237.4 |
| 6,489,624 B1 | * | 12/2002 | Ushio et al. ............ 250/559.27 |
| 6,515,293 B1 | * | 2/2003 | Jun et al. ................ 250/559.27 |

FOREIGN PATENT DOCUMENTS

| | | | |
|---|---|---|---|
| JP | 02170008 | * | 6/1990 |
| JP | 04223210 | * | 8/1992 |

* cited by examiner

*Primary Examiner*—Gregory J. Toatley, Jr.
*Assistant Examiner*—Sang H. Nguyen
(74) *Attorney, Agent, or Firm*—Lee & Morse, P.C.

(57) ABSTRACT

In an apparatus and a method of measuring a thickness of a multilayer on a substrate, a spectrum of reflected light reflected from the substrate is measured. A plurality of recipe data, each corresponding to one of a plurality of hypothetical multilayers, is stored. One of the plurality of hypothetical multilayers is initially assumed to be the multilayer actually formed on the substrate. A plurality of theoretical spectra is calculated using one of the plurality of recipe data in accordance with various theoretical thicknesses of one of the plurality of hypothetical multilayers. The measured spectrum is compared with the plurality of theoretical spectra to determine a temporary thickness of the multilayer. A reliability of the temporary thickness of the multilayer is estimated. The temporary thickness is output as a thickness of the multilayer on the substrate when the reliability of the temporary thickness is within an allowable range.

29 Claims, 9 Drawing Sheets

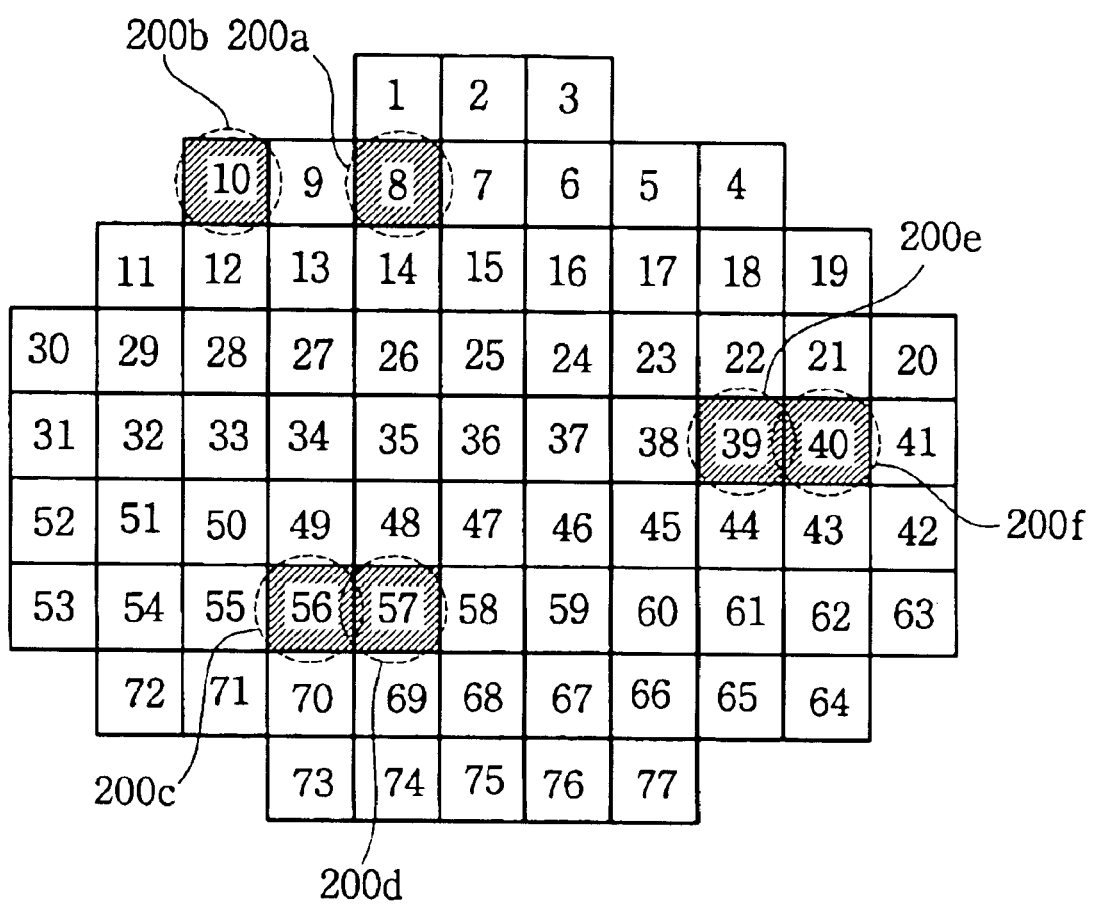

APPARATUS AND METHOD FOR MEASURING EACH THICKNESS OF A MULTILAYER STACKED ON A SUBSTRATE

BACKGROUND OF THE INVENTION

1. Field of the Invention

The present invention relates to an apparatus and a method for measuring each thickness of a multilayer stacked on a substrate, e.g., a semiconductor wafer. More particularly, the present invention relates to an apparatus and method for directly measuring a thickness of the multilayer using a patterned wafer rather than a monitoring wafer.

2. Description of the Related Art

Generally, a semiconductor fabricating process includes a deposition process for coating a thin layer, such as an insulation layer, a dielectric layer and a metal layer, on a wafer of monocrystalline silicon, and a photolithography process for forming a predetermined pattern on the thin layer. In addition, the thin layer is usually measured to confirm whether the thin layer is coated to a desired thickness and is etched away after performing the deposition or the photolithography processes.

Conventionally, a thickness of a thin layer is measured using a monitoring wafer, which is a kind of specimen wafer. When some process in the fabrication of a semiconductor device is performed, the monitoring wafer is subjected to the same process as a working wafer, which will be subsequently referred to as a patterned wafer after completion of the process. Then, the thickness of the layer on the monitoring wafer is measured and a process failure is detected based on the measured thickness of the layer. The layer on the monitoring wafer may be a layer that is newly formed by the process or a residual layer remaining thereon after the process.

The monitoring wafer only includes a single layer coated in the previous deposition process or a residual layer remaining after a previous etching process, so that a lower layer disposed under the single layer or the residual layer may not be formed in the same process. Accordingly, when the monitoring wafer is used for the measuring process, the thickness of only a single layer is measured. However, various kinds of thin layers are coated on the working wafer, and therefore, a plurality of monitoring wafers corresponding to each thin layer on the working wafer is necessary to measure each thickness of a multilayer on the patterned wafer. Furthermore, the monitoring wafer is usually discarded after only one or two measuring processes to maintain accurate measurement of the thickness. As a result, cost for the measuring process using the monitoring wafer is very high. In addition, there is a problem in that the thickness of the thin layer on the monitoring wafer is not always identical to the thickness of the thin layer on the patterned wafer.

Accordingly, the thickness of the thin layer requires measurement directly using the patterned wafer rather than the monitoring wafer. In general, various kinds of layers are sequentially stacked on the patterned wafer, and the layers as a whole stacked on the patterned wafer are collectively referred to as a multilayer. A multilayer may be referred to as a variable multilayer in that some of the stacked layers may be removed or other layers may be additionally stacked on the multilayer in a subsequent process. Therefore, the measuring method of the thickness of the thin layer using the patterned wafer has a fundamental problem in that the thickness of the layer needs to be measured without destroying the variable multilayer to prevent the patterned wafer from being damaged. Conventionally, a dual beam spectrometry method or a spectroscopic ellipsometry method has been used to measure the thickness of the layer without destruction thereof.

In the dual beam spectrometry method, light is incident on the patterned wafer at a substantially right angle from a light source, and a reflected light reflected from the wafer is divided into a sample channel and a reference channel. An intensity of the incident light is measured, and a reference intensity is calculated using a silicon reference chip. A relative reflectivity is obtained from the reference intensity and the actual intensity of the reference channel. Then, a thickness of the layer is obtained using the relative reflectivity. However, the dual beam spectrometry method has a problem in that the measured thickness is not accurate in a case where the layer is very thin or has a multilayer structure in which a plurality of layers is stacked on the wafer.

In the spectroscopic ellipsometry method, polarized light is incident on the wafer at a predetermined angle from a light source, and a reflected light reflected from the wafer is divided into horizontal and vertical polarization components with respect to the polarization direction. Then, a light intensity ratio of the horizontal and vertical polarization components is calculated, and a phase difference between the horizontal and vertical polarization components is obtained. A thickness of a layer on the wafer is obtained using the light intensity ratio and the phase difference between the horizontal and vertical polarization components.

According to the dual beam spectrometry method and the spectroscopic ellipsometry method, the reflected light reflected from the wafer is divided in accordance with a wavelength of the light, and a spectrum of each wavelength is measured. Then, the measured spectrum is compared with a theoretical spectrum, and a theoretical thickness corresponding to the theoretical spectrum that is substantially similar to the measured spectrum is determined to be the thickness of the layer.

When a multilayer is formed on the patterned wafer, the theoretical spectrum is accurately calculated on a condition that structural information of the multilayer, e.g., a stacked structure and a material characteristic of each component layer, is fully known. Specifically, the theoretical spectrum is significantly influenced by a type of each component layer, a sequential order along which the component layer is stacked, a refractive index n of each component layer, and an extinction coefficient k of each component layer. The refractive index is defined as a ratio of a velocity of light in the layer to the velocity of light in a vacuum. The extinction coefficient is defined as a reducing rate of the intensity of light when light passes through the layer.

Therefore, when the information on the multilayer is not accurate, the measured spectrum may not be identical to the theoretical spectrum, and the measured thickness of the multilayer may not be reliable.

In a theoretical patterned wafer, each component layer of the multilayer is stacked on the wafer according to a designed sequential order, and the structural information of the multilayer is well known. However, when a process failure is generated during formation of one of the component layers in the multilayer, and the actual stacked structure of the multilayer is different from an expected structure of the multilayer, the structural information of the multilayer may not be accurately known. As a result, the thickness of the component layer is not accurately measured by the dual beam spectrometry method or the spectroscopic ellipsometry method. In particular, when the multilayer is formed to have a locally different stack structure due to a poor evenness of the patterned wafer, the measured thickness of a component layer in the multilayer is completely unreliable.

SUMMARY OF THE INVENTION

The present invention is therefore directed to an apparatus and a method for measuring a thickness of a multilayer coated on a patterned wafer, which substantially overcome one or more of the problems due to the limitations and disadvantages of the related art.

It is a feature of an embodiment of the present invention to provide an apparatus and a method for measuring a thickness of a multilayer coated on a patterned wafer directly without damaging the patterned wafer.

It is another feature of an embodiment of the present invention to provide an apparatus and a method for measuring a thickness of a multilayer coated on a patterned wafer that is capable of accurately measuring the thickness of the multilayer regardless of whether a process error has occurred during the formation of the multilayer.

At least one of the above and other features and advantages of the present invention may be realized by providing an apparatus for measuring a thickness of a multilayer on a substrate including a measuring unit for measuring reflected light to generate a measured spectrum of the reflected light, the reflected light being reflected from the substrate on which the multilayer is formed, an input unit for inputting a plurality of recipe data, each of the plurality of recipe data corresponding to one of a plurality of hypothetical multilayers, one of the hypothetical multilayers being initially assumed as the multilayer actually formed on the substrate, a first storing unit for storing the measured data, a second storing unit for storing the plurality of recipe data, an output unit for outputting a thickness of the multilayer on the substrate, and a control unit connected to the measuring unit, the input unit, the first and second storing units and the output unit, wherein the control unit calculates a plurality of theoretical spectra, each of which indicates at least a thickness of each component layer of the hypothetical multilayer assumed to be the multilayer actually formed on the substrate, using one of the plurality of recipe data, compares the measured spectrum with the plurality of theoretical spectra, thereby determining a temporary thickness of the multilayer, estimates whether a reliability of the temporary thickness is within an allowable range, and transfers the temporary thickness to the output unit when the reliability is within the allowable range or repeats the selection of the temporary thickness after changing the recipe data when the reliability is outside of the allowable range.

The measuring unit may include a loading part for loading the substrate, a light source for generating source light, a polarizer for polarizing the source light, so that polarized light is directed onto the substrate and reflected from the substrate, and an analyzer for analyzing the reflected light for measuring the data to generate the measured spectrum.

The measuring unit may include a prism for dividing the reflected light from the analyzer into horizontal and vertical polarization components, and detector receiving the horizontal and vertical polarization components and outputting intensities thereof which provide an intensity ratio and a phase difference between the horizontal and vertical polarization components in accordance with a wavelength of the reflected light.

The control unit may select one of the plurality of theoretical spectra having a least amount of spectrum error, and determines a theoretical thickness that is used in calculating the theoretical spectrum as the temporary thickness, wherein the spectrum error is a difference between the measured spectrum and the theoretical spectrum.

The reliability of the temporary thickness may include a number indicating a magnitude of the spectrum error.

Each of the plurality of recipe data may include a stack order of each component layer of the corresponding hypothetical multilayer, a stack number of each component layer of the hypothetical multilayer, and physical information on each component layer.

The physical information of each component layer may include a refractive index and an extinction coefficient of each component layer.

At least one of the above and other features and advantages of the present invention may be realized by providing a method of measuring a thickness of a multilayer on a substrate including measuring a spectrum of reflected light, the reflected light being reflected from the substrate on which the multilayer is formed, after directing source light onto the substrate, storing a plurality of recipe data, each corresponding to one of a plurality of hypothetical multilayers, wherein one of the plurality of hypothetical multilayers is initially assumed to be the multilayer actually formed on the substrate, calculating a plurality of theoretical spectra using one of the plurality of recipe data in accordance with various theoretical thicknesses of one of the plurality of hypothetical multilayers, comparing the measured spectrum with the plurality of theoretical spectra to determine a temporary thickness of the multilayer, estimating a reliability of the temporary thickness of the multilayer, and outputting the temporary thickness as a thickness of the multilayer on the substrate when the reliability of the temporary thickness is within an allowable range.

Calculating a plurality of theoretical spectra using another one of the plurality of recipe data, comparing the measured spectrum with the plurality of theoretical spectra, and estimating a reliability of the temporary thickness of the multilayer may be sequentially repeated when the reliability of the temporary thickness is outside of the allowable range.

When the reliability of the temporary thickness is outside of the allowable range and all of the plurality of recipe data have been used, the temporary thickness having the greatest reliability may be output as the thickness of the multilayer on the substrate.

Each of the plurality of recipe data may include a stack order of each component layer of the corresponding hypothetical multilayer, a stack number of each component layer of the hypothetical multilayer, and physical information on each component layer.

The physical information of each component layer may include a refractive index and an extinction coefficient of each component layer.

The source light may output polarized light, and the method may further include dividing the reflected light into horizontal and vertical polarization components, and determining an intensity ratio and a phase difference between the horizontal and vertical polarization components in accordance with a wavelength of the reflected light.

An optimal spectrum having a least amount of spectrum error may be selected from among the plurality of theoretical spectra, and a thickness with respect to the optimal spectrum is determined as the temporary thickness of the multilayer on the substrate, wherein the spectrum error is a difference between the measured spectrum and the theoretical spectrum.

The reliability of the temporary thickness may be expressed as a number indicating a magnitude of the spectrum error.

The substrate may include a patterned wafer on which semiconductor processing is performed.

Measuring a spectrum of the reflected light may be performed on an oxide site (OS) formed in a scribe line of the patterned wafer. Measuring a spectrum of the reflected light may be sequentially performed at a plurality of measuring points on the substrate.

At least one of the above and other features and advantages of the present invention may be realized by providing a method of measuring a thickness of a multilayer on a patterned wafer including measuring a plurality of spectra of reflected light at a plurality of measuring points on the patterned wafer, the reflected light being reflected from each of the plurality of measuring points on the patterned wafer on which the multilayer is formed, after directing source light onto the plurality of measuring points, storing a plurality of recipe data, each corresponding to one of a plurality of hypothetical multilayers, wherein one of the plurality of hypothetical multilayers is initially assumed to be the multilayer actually formed on the patterned wafer, calculating a plurality of theoretical spectra using one of the plurality of recipe data in accordance with various theoretical thicknesses of one of the hypothetical multilayers, comparing each of the plurality of measured spectra with the plurality of theoretical spectra to determine a plurality of temporary thickness of the multilayer at each measuring point, estimating a reliability of each of the plurality of temporary thicknesses of the multilayer, and outputting the plurality of temporary thicknesses as actual thicknesses of the multilayer at each of the plurality of measuring points when the reliability of the temporary thickness is within an allowable range.

Calculating a plurality of theoretical spectra using another one of the plurality of recipe data, comparing each of the plurality of measured spectra with the plurality of theoretical spectra, and estimating a reliability of each of the temporary thicknesses of the multilayer may be subsequently repeated at each measuring point having a reliability of the temporary thickness outside of the allowable range.

When the reliability of the temporary thickness is outside of the allowable range and all of the plurality of recipe data have been used, the temporary thickness having the greatest reliability may be output as an actual thickness of the multilayer at each of the plurality of measuring points.

In either method according to the present invention, one of the plurality of hypothetical multilayers may be a standard multilayer that is stacked in accordance with a designed sequential order. The plurality of theoretical spectra may be initially calculated using the recipe data corresponding to the standard multilayer. Another one of the plurality of hypothetical multilayers may be determined sequentially whenever an uppermost component layer is removed from the standard multilayer. Another one of the plurality of hypothetical multilayers may be determined sequentially whenever an additional layer is formed on the standard multilayer.

According to the present invention, even though an actual stack structure of the multilayer may vary from the originally designed structure, the thickness of the multilayer may be accurately measured and satisfy a reliability condition, by changing the recipe data.

BRIEF DESCRIPTION OF THE DRAWINGS

The above and other features and advantages of the present invention will become readily apparent to those of ordinary skill in the art by reference to the following detailed description when considered in conjunction with the accompanying drawings, in which:

FIG. 5 illustrates a view of a wafer map indicating a plurality of measuring points;

DETAILED DESCRIPTION OF THE INVENTION

Figure 1:
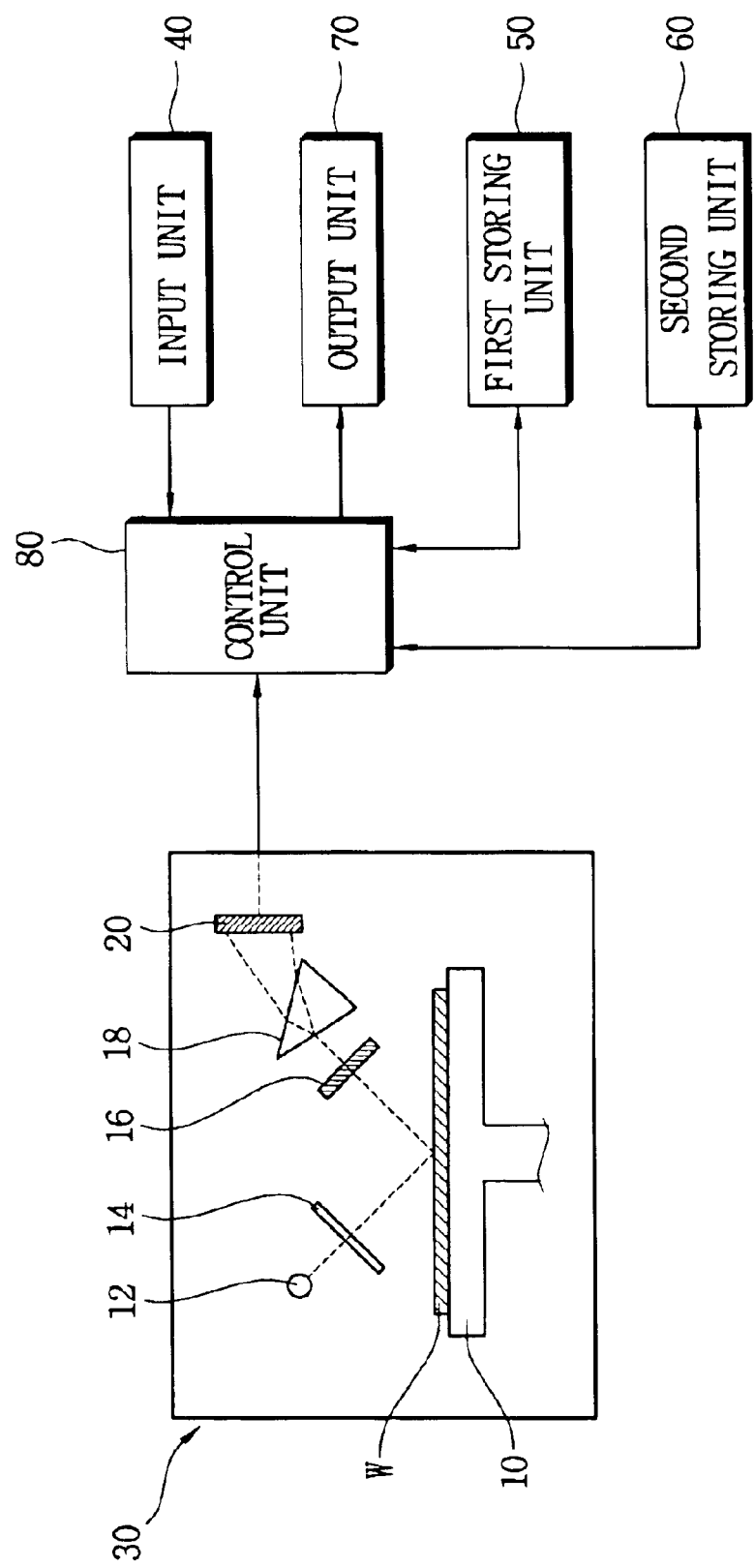
FIG. 1 schematically illustrates an apparatus for measuring a thickness of each layer constituting a multilayer on a wafer according to an exemplary embodiment of the present invention.

Korean Patent Application No. 2003-56961, filed on Aug. 18, 2003, in the Korean Intellectual Property Office, and entitled: "Apparatus and Method for Measuring Each Thickness of a Multilayer Stacked on a Substrate," is incorporated by reference herein in its entirety.

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, the thickness of layers and regions are exaggerated for clarity. Like reference numerals refer to similar or identical elements throughout.

Apparatus for Measuring a Thickness of a Multilayer

FIG. 1 schematically illustrates an apparatus for measuring a thickness of each layer constituting a multilayer coated on a patterned wafer according to an exemplary embodiment of the present invention. In an exemplary embodiment, a thickness of the multilayer is measured by the spectroscopic ellipsometry method.

Referring to FIG. 1, the apparatus for measuring a thickness of a multilayer according to an exemplary embodiment of the present invention includes a measuring unit 30 for analyzing a reflected light reflected from a patterned wafer W and measuring data to generate a measured spectrum of the reflected light. The measuring unit 30 may also output the measured spectrum of the reflected light. In operation, polarized light is directed onto the patterned wafer W, on which the multilayer is coated, and is reflected from the wafer W. The reflected light is then divided into horizontal and vertical polarization components, and an intensity ratio and a phase difference between the horizontal and vertical polarization components of the reflected light are obtained. The measuring unit 30 provides graphs showing the relationships between the intensity ratios and the wavelengths of light, and the phase differences and the wavelengths of light. Hereinafter, one of the above graphs is referred to as a spectrum of polarized light. Accordingly, the measuring unit 30 provides a spectrum of the reflected light reflected from the patterned wafer W.

The measuring unit 30 includes a loading part 10 for loading the patterned wafer W, a light source 12 for generating light, a polarizer 14 for polarizing light generated from the light source 12, an analyzer 16 for analyzing the reflected light reflected from the patterned wafer W and generating the spectrum of the reflected light, a prism 18 and a detector 20. Polarized light is directed onto the patterned wafer W at a predetermined angle with respect to the wafer surface and a plurality of mirrors is disposed on a travel path of the polarized light to change the travel path of the polarized light. The analyzer 16 transmits reflected light from the patterned wafer W proportional to a polarization state of the reflected light. The prism 18 divides the reflected light transmitted by the analyzer 16 into horizontal and vertical polarization components. The detector 20 measures an intensity of the horizontal and vertical polarization components of the reflected light in accordance with the wavelength of reflected light. From these intensities, an intensity ratio between horizontal and vertical polarization components and the phase difference between the horizontal and vertical polarization components of the reflected light may be determined in known manners.

The apparatus for measuring the thickness of the multilayer also includes an input unit 40 for inputting a plurality of recipe data, each corresponding to one of a plurality of hypothetical multilayers. The hypothetical multilayer is a theoretical pseudo-multilayer that is assumed to be the multilayer actually formed on the patterned wafer W and has a theoretical stack structure satisfying design conditions. Therefore, the operator of the apparatus inputs the recipe data corresponding to the hypothetical multilayer assuming that the actual multilayer is stacked on the patterned wafer according to a designed sequential order. The recipe data corresponding to the hypothetical multilayer includes a stack order of the layers, a stack number of each component layer of the hypothetical multilayer, and refractive indices and extinction coefficients of each component layer. The input recipe data are used to obtain a theoretical spectrum of the hypothetical multilayer corresponding thereto.

A first storing unit 50 stores the measured spectrum of the reflected light. In addition, a second storing unit 60 stores the input recipe data corresponding to the hypothetical multilayer.

An output unit 70 outputs the thickness of each layer constituting the actual multilayer coated on the wafer.

A control unit 80 controls the measuring unit 30, the input unit 40, the first and second storing units 50 and 60 and the output unit 70.

In detail, the control unit 80 calculates a theoretical spectrum of the hypothetical multilayer using corresponding recipe data that is stored in the second storing unit 60. The control unit 80 calculates an intensity ratio and a phase difference using known theoretical formulae using the recipe data including physical information on the hypothetical multilayer. Then, the intensity ratio and the phase difference are arranged in accordance with the wavelength of light, thereby forming the theoretical spectrum of the hypothetical multilayer corresponding to the recipe data. Here, the theoretical spectrum may be repeatedly formed in accordance with various theoretical thicknesses of each component layer in the hypothetical multilayer. The theoretical thicknesses of each component layer may be varied within an allowable marginal range. Accordingly, a plurality of theoretical spectra is obtained with respect to every theoretical thickness of the hypothetical multilayer. The relationship between the theoretical spectrum and the theoretical thickness of the hypothetical multilayer is referred to as a dispersion curve. A plurality of dispersion curves may be stored in a form of a library file.

The measured spectrum of the patterned wafer is compared with the theoretical spectra, and one theoretical thickness is temporarily selected as a thickness of the actual multilayer on the patterned wafer. More specifically, the measured spectrum is repeatedly compared with all theoretical spectra, and the theoretical spectrum that minimizes a spectrum error, i.e., has a least amount of spectrum error, is selected as an optimal spectrum. The spectrum error of the theoretical spectrum indicates a discordance or difference between the measured spectrum and the theoretical spectrum. Therefore, the theoretical thickness related to the optimal spectrum is selected as the temporary thickness of the actual multilayer.

To estimate a reliability of the temporary thickness, a goodness of fit (GOF) of the optimal spectrum based on the temporary thickness is calculated to be a number between zero (0) and one (1). The GOF is a number indicating a degree of accordance between the measured spectrum and the optimal spectrum. When the GOF is 1, the measured spectrum is substantially identical to the optimal spectrum. When the GOF is 0, the measured spectrum is substantially different from the optimal spectrum.

When the GOF is outside of an allowable GOF range, which has been previously set, the recipe data are changed and another temporary thickness is selected in the same way as described above. When the GOF is within the allowable range, the temporary thickness that is used for calculating the optimal spectrum is transferred to the output unit 70 as the thickness of the actual multilayer on the patterned wafer. When the GOF is outside of the allowable range even though all the recipes stored in the second storing unit 60 have been utilized, the temporary thickness having the highest GOF is transferred to the output unit 70.

More specifically, when the GOF is outside of the allowable range, the temporary thickness corresponding to the GOF is determined as incorrect, and another temporary thickness is repeatedly searched after changing the recipe data until a more accurate temporary thickness is obtained. Resultantly, the thickness of the multilayer is obtained with the highest possible accuracy.

Method of Measuring a Thickness of a Multilayer

First Embodiment

Figure 2:
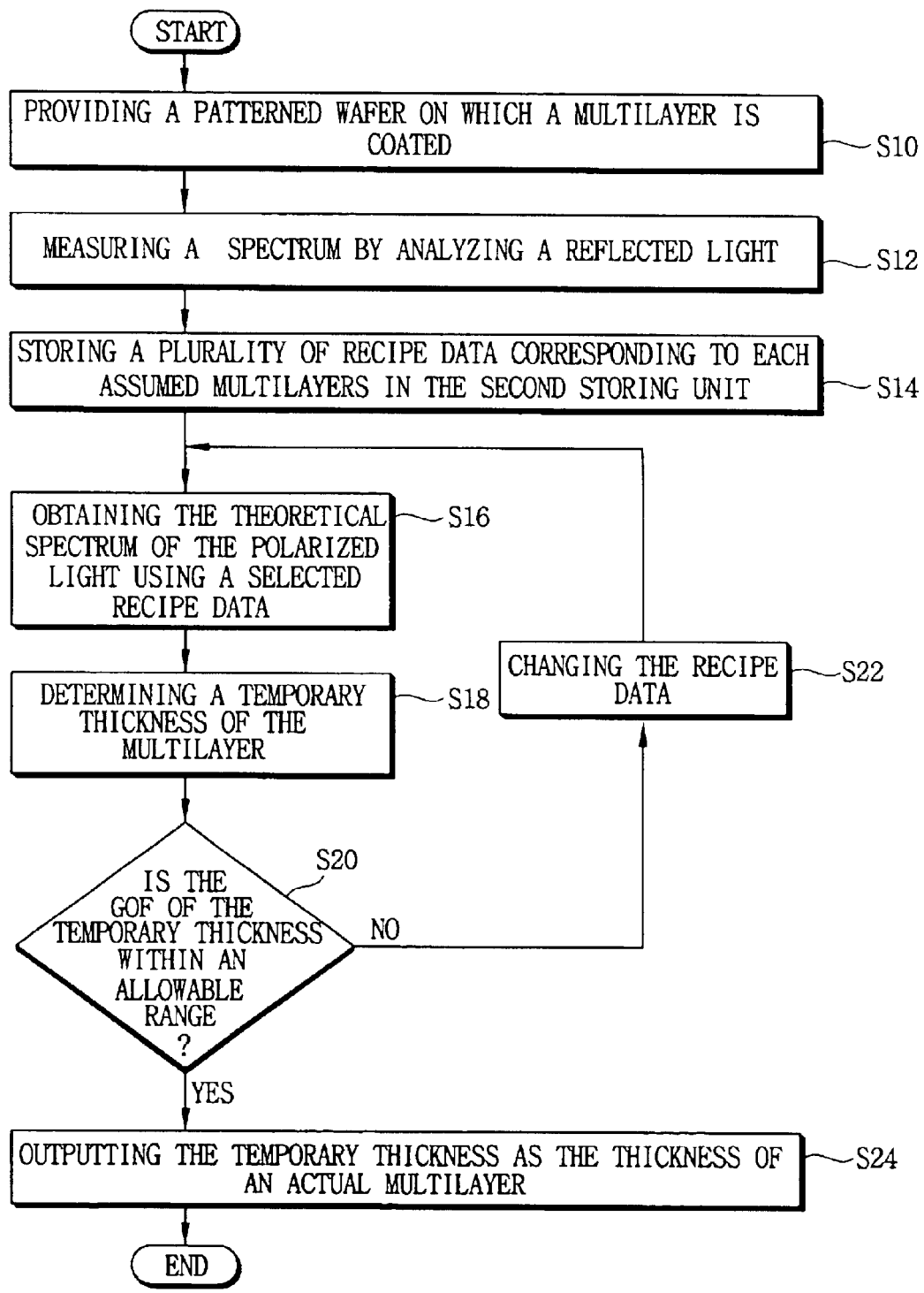
FIG. 2 is a flow chart for explaining a method of measuring a thickness of a multilayer according to a first embodiment of the present invention.

FIG. 2 is a flow chart for explaining a method of measuring a thickness of a multilayer according to a first embodiment of the present invention.

As shown in FIG. 2, in step S10, a patterned wafer on which a multilayer is coated is provided. A plurality of oxide sites (OS) is formed in a scribe line of the patterned wafer to check various process failures that may be generated during various processes. At least one of the plurality of OS has a stacked structure for measuring the thickness of the multilayer. Accordingly, the thickness of the multilayer on the patterned wafer is measured at the OS having the stacked structure.

In an exemplary embodiment, the method assumes that first through fifth layers were sequentially initially coated on an OS, and the fourth and fifth layers were sequentially etched away from the OS during an etching process. Therefore, the measuring apparatus of the present invention described above measures each thickness of the layers at the OS remaining after the etching process. Polarized light is directed onto the OS point to measure the thickness of the patterned wafer, and is reflected from the patterned wafer.

In step S12, the reflected light is detected and analyzed according to the wavelength thereof, and is divided into horizontal and vertical polarization components. Subsequently, an intensity ratio and a phase difference between the horizontal and vertical polarization components are obtained as a function of the wavelength of the polarized light. Specifically, the intensity ratio and the phase difference between the horizontal and vertical polarization components of the polarized light are distributed with respect to the wavelength of the polarized light, which is referred to as a measured spectrum hereinafter. The measured spectrum of the polarized light is stored in the first storing unit.

In step S14, one of a plurality of hypothetical multilayers is initially assumed to be an actual multilayer on the patterned wafer, and a plurality of recipe data, each of which corresponds to one of the hypothetical multilayers, is stored in the second storing unit. Each of the recipe data includes some physical information on each hypothetical multilayer based on a condition that the multilayer is stacked on the patterned wafer according to a designed sequential order. The recipe data may alternatively be stored before generating the measured spectrum.

For example, the plurality of hypothetical multilayers is assumed as follows. At first, an arbitrary multilayer having an original designed stack structure is designated as a first hypothetical multilayer. That is, each of the layers in the first hypothetical multilayer is assumed to be stacked on the patterned wafer in accordance with a designed sequential order. The first hypothetical multilayer may be referred to as a standard multilayer. Then, an uppermost layer is presumptively removed from the first hypothetical multilayer, and the first hypothetical multilayer without the uppermost layer thereof is designated as a second hypothetical multilayer. In the same way, whenever an uppermost layer is presumptively removed from a hypothetical multilayer, a new hypothetical multilayer is sequentially designated, e.g., first, second, third, etc. By way of further example, the second hypothetical multilayer without the uppermost layer thereof is designated as a third hypothetical multilayer. Similarly, whenever an additional layer is presumptively added on the first hypothetical multilayer, a new hypothetical multilayer may also be sequentially designated. When an additional layer is presumptively added on the first hypothetical multilayer, the first hypothetical multilayer including the additional layer is designated as a fourth hypothetical multilayer. As a result, the plurality of hypothetical multilayers is designated based on the first hypothetical multilayer having an originally designed stack structure.

In an exemplary embodiment, the first hypothetical multilayer includes first, second and third layers that are presumed to be sequentially stacked on the patterned wafer according to a designed sequential order. The third layer of the first hypothetical multilayer is then removed, thus the second hypothetical multilayer includes only the first and second layers. For example, an over-etching of the first hypothetical multilayer may remove the uppermost layer of the first hypothetical multilayer, thereby forming the second hypothetical multilayer. The second layer of the second hypothetical multilayer is then removed and a third hypothetical multilayer is formed including only the first layer. Similar to the formation of the second hypothetical multilayer, an over-etching of the second hypothetical multilayer may remove the uppermost layer of the second hypothetical multilayer, thereby forming the third hypothetical multilayer. An additional fourth layer is then presumptively disposed on the third layer of the first hypothetical multilayer, thereby forming the fourth hypothetical multilayer. For example, the fourth layer may be a surplus layer remaining on the first hypothetical multilayer due to insufficient etching. An additional fifth layer is presumptively disposed on the fourth layer of the fourth hypothetical multilayer, thereby forming the fifth hypothetical multilayer. The fifth hypothetical multilayer corresponds to a stack structure of the actual multilayer on the patterned wafer when any layer on the wafer is not etched away due to an etching failure.

In the exemplary embodiment described above, the first layer and the fifth layer are the bottom layer and the top layer of the actual multilayer, respectively, thus additional hypothetical multilayers, e.g., a sixth hypothetical multilayer having an additional layer presumptively disposed on the fifth layer, or a seventh hypothetical multilayer in which the first layer is presumptively removed, etc., may not be needed.

Subsequently, a plurality of recipe data, each corresponding to one of the plurality of the hypothetical multilayers is prepared. Thus, five kinds of recipe data, i.e., a first recipe data through a fifth recipe data, are prepared. The recipe data include a stack order of the layers, a stack number of each component layer of the hypothetical multilayer, and physical information on the hypothetical multilayer. The physical information of the multilayer includes a refractive index n and an extinction coefficient k of each component layer of the hypothetical multilayer.

The intensity ratio and the phase difference are theoretically calculated with respect to each wavelength of the polarized light using the first recipe data, and, in step S16, a theoretical spectrum of the polarized light is obtained using the intensity ratio, the phase difference and an assumed thickness of the component layer of the hypothetical multilayer. Specifically, the intensity ratio and the phase difference are calculated by a theoretical formula of the ellipsometry using the refractive index n and extinction coefficient k included in the first recipe data. Then, a thickness of each component layer of the hypothetical multilayer is assumed, and the theoretical spectrum is obtained by another theoretical formula of the ellipsometry using the refractive index n, the extinction coefficient k and the assumed layer thickness. The thickness of the component layer may be selected within a predetermined marginal error range that is an allowable error range in processing the actual multilayer on the patterned wafer.

When the theoretical spectrum is obtained for a first time, the first recipe data are initially utilized from among the plurality of recipe data. If no process failure is generated on the patterned wafer, the first hypothetical multilayer is substantially identical to the actual multilayer coated on the patterned wafer. Therefore, the actual thickness of the multilayer is substantially similar to the thickness of the theoretical spectrum based on the first recipe data.

The measured spectrum is compared with a plurality of theoretical spectra based on the first recipe data and a plurality of assumed thicknesses, and the discordance or difference between the measured spectrum and each theoretical spectrum is checked. Hereinafter, the discordance or difference between the measured spectrum and the theoretical spectrum is referred to as a spectrum error of the theoretical spectrum. The theoretical spectrum having the least amount of spectrum error, i.e., the theoretical spectrum where the spectrum error is minimized, is regarded as a most accurately approximated spectrum of the actual multilayer coated on the patterned wafer. Hereinafter, the theoretical spectrum having the least amount of spectrum error is referred to as an optimal spectrum of the theoretical spectrum. The thickness of the optimal spectrum is treated as the thickness of the actual multilayer. Therefore, in step S18, the thickness of the first through third component layers of the hypothetical multilayer is temporarily regarded as the first through third component layers of the actual multilayer, respectively. The thickness of the first hypothetical multilayer based on the first recipe data is referred to as a first temporary thickness.

To evaluate a reliability of the temporary thickness, a GOF is calculated. In step S20, a decision step for deciding whether the GOF of the optimal spectrum based on the first temporary thickness is within an allowable range is performed to evaluate the reliability of the first temporary thickness. The allowable GOF range is preset before the process. In step S24, when the GOF of the optimal spectrum is within the allowable range, the first temporary thickness is transmitted to an output unit as the thickness of the actual multilayer. Therefore, each thickness of the first through third layers of the first hypothetical multilayer is output as the thickness of each component layer of the actual multilayer coated on the patterned wafer.

When the GOF of the optimal spectrum is outside of the allowable range, another temporary thickness is obtained using another recipe data characterizing another hypothetical multilayer by the same process described above after changing the recipe data in step S22. The allowable GOF range also estimates the reliability of another temporary thickness.

Specifically, when the first temporary thickness is determined to be unreliable, a plurality of second theoretical spectra is obtained based on the second recipe data characterizing a second hypothetical multilayer in step S16. Then, the measured spectrum is compared with a plurality of the second theoretical spectra calculated using a plurality of thicknesses of the second hypothetical multilayer. Then, the optimal spectrum is selected among the plurality of the second theoretical spectra. The thickness in connection with the optimal spectrum is also temporarily treated as the thickness of the actual multilayer, thus the thickness of the second hypothetical multilayer is regarded as a second temporary thickness of the actual multilayer in step S18. Then, in step S20, the GOF of the optimal spectrum based on the second temporary thickness is calculated to evaluate the reliability of the second temporary thickness.

When the GOF of the optimal spectrum is within the allowable range, the second temporary thickness is transmitted to the output unit, and, in step S24, each thickness of the first and second layers in the second hypothetical multilayer is output as the thickness of each component layer of the actual multilayer. However, when the optimal spectrum is outside of the allowable range, a third temporary thickness is obtained using the third recipe data corresponding to the third hypothetical multilayer by the same process described above. If the optimal spectrum based on the third temporary thickness is outside of the allowable GOF range, a fourth or a fifth temporary thickness is obtained by repeating the same process described above, as necessary.

When the GOF of the optimal spectrum concerning the temporary thickness is within the allowable range, in step S24, the temporary thickness is output as the thickness of the actual multilayer coated on the patterned wafer without performing a subsequent thickness measuring process. When the GOF of the optimal spectrum is outside of the allowable range even though all of the recipe data have been used, the temporary thickness that is used for calculating a theoretical spectrum of which the GOF is most accurate among those of the given theoretical spectra is output as the thickness of the actual multilayer coated on the patterned wafer. Therefore, the thickness of the multilayer sequentially stacked on the patterned wafer can be measured without directly contacting the multilayer. In addition, although the actual multilayer may not have the same structure as expected due to various process failures, the multilayer thickness can still be accurately measured.

Second Embodiment

FIGS. 3A to 3E illustrate cross-sectional views of various hypothetical multilayers that may correspond to an actual multilayer formed on the patterned wafer.

Figure 3A:
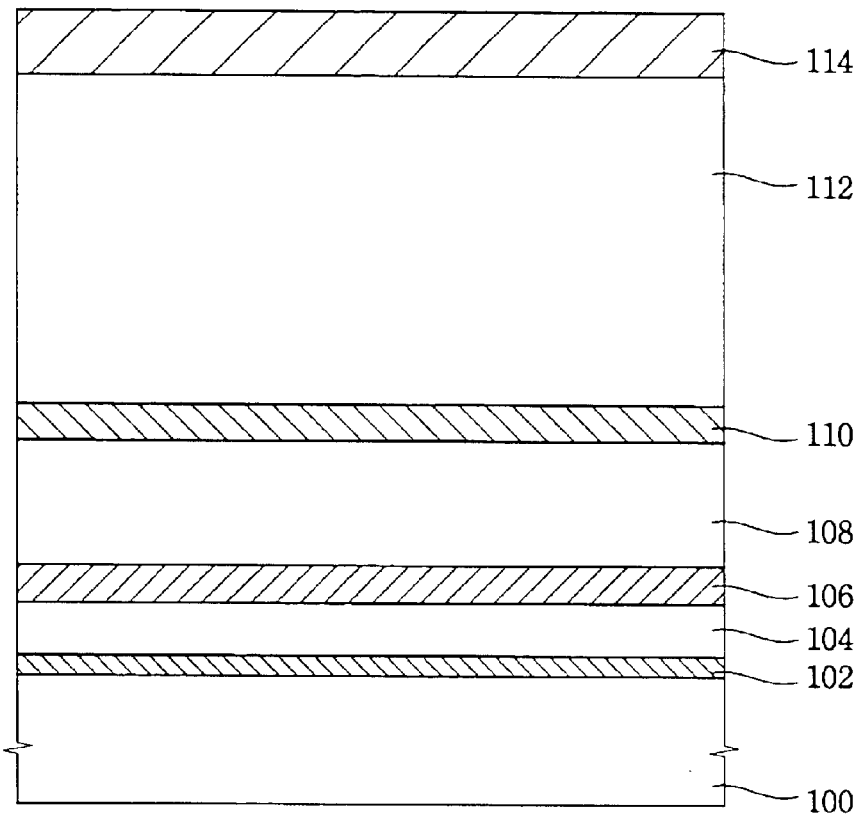
FIGS. 3A to 3E illustrate cross-sectional views of various hypothetical multilayers corresponding to an actual multilayer formed on a patterned wafer.

A patterned wafer, on which a multilayer is formed, is loaded into a process chamber. In an exemplary embodiment, the multilayer on the patterned wafer is formed as follows: a first silicon nitride layer 102 having a thickness of about 260 Å, a first silicon oxide layer 104 having a thickness of about 750 Å, a second silicon nitride layer 106 having a thickness of about 500 Å, a second silicon oxide layer 108 having a thickness of about 5500 Å, a third silicon nitride layer 110 having a thickness of about 600 Å, a third silicon oxide layer 112 having a thickness of about 13,000 Å and a fourth silicon nitride layer 114 having a thickness of about 3000 Å are sequentially stacked in that order on an upper surface of a silicon wafer 100, as shown in FIG. 3A. Then, the fourth silicon nitride layer 114, the third silicon oxide layer 112 and the third silicon nitride layer 110 are completely etched away, and the second silicon oxide layer 108 is partially etched away. A thickness of the multilayer remaining on the patterned wafer is measured to confirm whether the etching process has been performed without failure. In completing the etching process without any failure, the first silicon nitride layer 102 having a thickness of about 260 Å, the first silicon oxide layer 104 having a thickness of about 750 Å, a second silicon nitride layer 106 having a thickness of about 500 Å, and a second silicon oxide layer 108 having a thickness of about 5500 Å are expected to be sequentially stacked in that order from the upper surface of the silicon wafer 100.

Figure 4A:
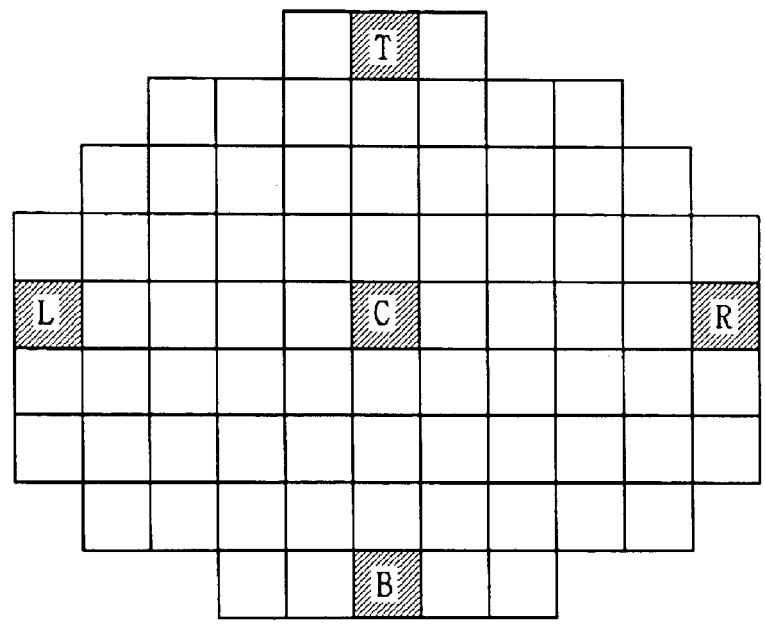
FIG. 4A illustrates a view of a measuring region on a patterned wafer on which a thickness of the multilayer is measured.
Figure 4B:
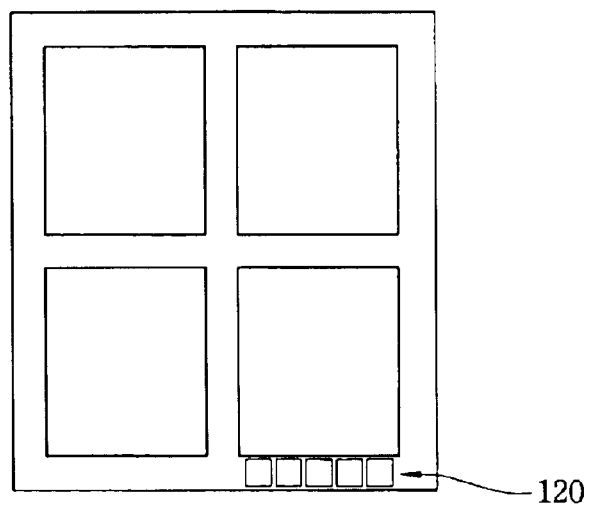
FIG. 4B illustrates a view of an oxide site formed in a scribe line corresponding to the measuring region shown in FIG. 4A.

FIG. 4A illustrates a view of a measuring region on the patterned wafer on which the thickness of the multilayer is measured. FIG. 4B illustrates a view of an oxide site formed in a scribe line corresponding to the measuring region shown in FIG. 4A.

A plurality of measuring points for measuring a thickness of a multilayer is defined on the patterned wafer, and a plurality of OS corresponding to the measuring points is designated for performing the thickness measuring process. Generally, an OS is designated at least at a top (T), a central (C), a bottom (B), a left (L) and a right (R) portion of the patterned wafer. In this embodiment, OS are designated at each of the top, central, bottom, left and right portions of the patterned wafer, so that first through fifth oxide sites are designated. The OS 120 is a testing pattern for checking for process failures, and is formed in a scribe line. At least one of the OS 120 has substantially the same stack structure as the pattern stacked in a chip region of the patterned wafer.

Polarized light is directed onto the first OS, and reflected light reflected from the first OS is detected. The reflected light is detected and analyzed according to the wavelength thereof, and the reflected light is divided into horizontal and vertical polarization components. Therefore, the intensity ratio and the phase difference between the horizontal and vertical polarization components are obtained as a function of the wavelength of the polarized light. Specifically, the intensity ratio and the phase difference between the horizontal and vertical polarization components of the polarized light are distributed with respect to the wavelength of the polarized light. Therefore, the measured spectrum of the polarized light reflected from the first OS is obtained and output. The measured spectrum is stored.

Then, a plurality of recipe data corresponding to a plurality of hypothetical multilayers, which is determined by anticipating the actual multilayer formed on the patterned wafer, is prepared and stored in the second storing unit.

Figure 3B:
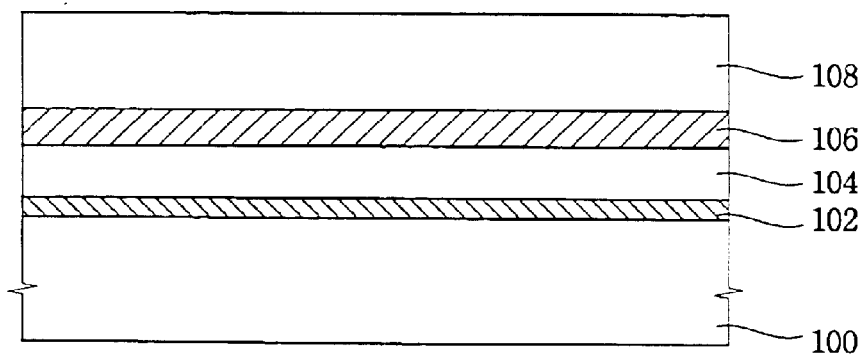

As shown in FIG. 3B, a first hypothetical multilayer that has the same stack structure as expected in design of the multilayer is expected to have a first silicon nitride layer 102, a first silicon oxide layer 104, a second silicon nitride layer 106, and a second silicon oxide layer 108 stacked in a respective sequence from the upper surface of the silicon wafer 100. The first hypothetical multilayer may also be referred to as a standard multilayer. The first recipe data includes a stack order of the first hypothetical multilayer, a refractive index n of each component layer and an extinction coefficient k of each component layer.

Figure 3C:
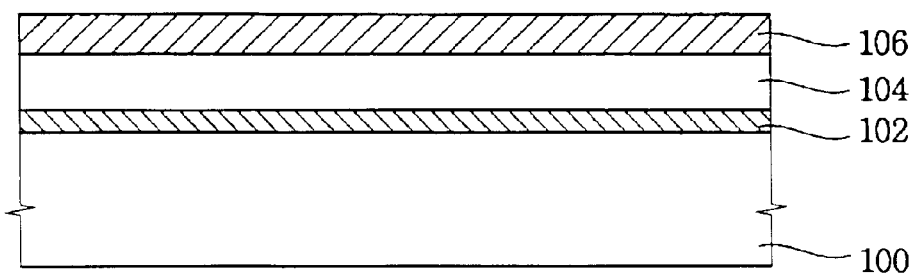

A second hypothetical multilayer is expected to have the first silicon nitride layer 102, the first silicon oxide layer 104, and the second silicon nitride layer 106 stacked in a respective sequence from the upper surface of the silicon wafer 100, as shown in FIG. 3C. Therefore, when the uppermost layer is removed from the first hypothetical multilayer, the second hypothetical multilayer is formed. The second recipe, data include a stack order of the second hypothetical multilayer, a refractive index n of each component layer and an extinction coefficient k of each component layer of the second hypothetical multilayer.

Figure 3D:
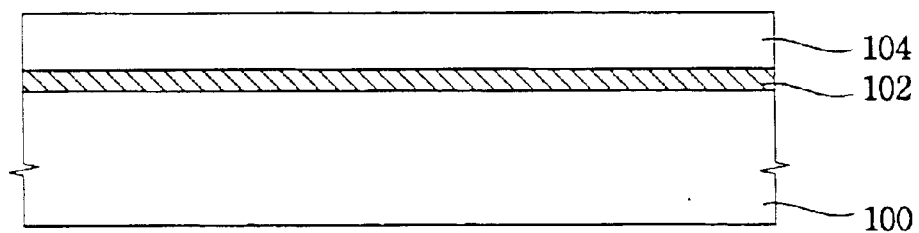

A third hypothetical multilayer is expected to have the first silicon nitride layer 102 and the first silicon oxide layer 104 stacked in a respective sequence, from the upper surface of the silicon wafer 100, as shown in FIG. 3D. Therefore, when the uppermost layer is removed from the second hypothetical multilayer, the third hypothetical multilayer is formed.

Figure 3E:
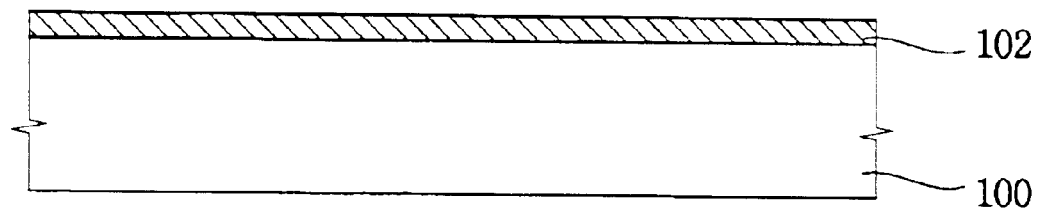

A fourth hypothetical multilayer is expected to have only the first silicon nitride layer 102 coated on the upper surface of the silicon wafer 100, as shown in FIG. 3E. Therefore, when the uppermost layer is removed from the third hypothetical multilayer, the fourth hypothetical multilayer is formed. The first silicon nitride layer 102 is a bottom layer directly contacting the wafer 100, and a hypothetical multilayer is unnecessary.

Although not shown in figures, another hypothetical multilayer may be expected to have a third silicon nitride layer with a thickness of about 600 Å, a third silicon oxide layer with a thickness of about 13,000 Å and a fourth silicon nitride layer with a thickness of about 3000 Å stacked, respectively, from the uppermost layer of the first hypothetical multilayer. However, when the layer is so thick that the etching process for removing the layer is excessively performed, an upper layer of the patterned wafer may be removed due to over-etching. Therefore, other hypothetical multilayers including other layers on the uppermost layer of the first hypothetical multilayer may be unnecessary, and additional recipe data corresponding to the other hypothetical multilayers may not be needed.

Next, a plurality of theoretical spectra is obtained using the first recipe data according to a theoretical equation. Specifically, the refractive indices and the extinction coefficients of the first silicon nitride layer 102, the first silicon oxide layer 104, the second silicon nitride layer 106 and the second silicon oxide layer 108, which are already set in the first recipe data, are used in the theoretical equation, and the theoretical spectrum is obtained in conformity with the wavelength of light on a condition that the thickness of the first hypothetical multilayer is predetermined. The theoretical spectrum is repeatedly obtained by varying the thickness of the hypothetical multilayer within a predetermined range, thus a plurality of theoretical spectra is formed. The thickness of the multilayer may be selected from an allowable marginal range of the thickness of each component layer. The theoretical spectrum is output and stored in accordance with the thickness of the first hypothetical multilayer.

Subsequently, a measured spectrum at the first OS is compared with a plurality of theoretical spectra, and one of the theoretical spectra having the least amount of spectrum error is selected as an optimal spectrum that most closely fits the measured spectrum. As a result, the thickness of each component layer of the first hypothetical multilayer is temporarily regarded as each thickness of the actual multilayer, which is referred to as a first temporary thickness. Accordingly, a plurality of first temporary thicknesses of the first silicon nitride layer 102, the first silicon oxide layer 104, the second silicon nitride layer 106 and the second silicon oxide layer 108 is simultaneously determined.

The GOF of the optimal spectrum is estimated with respect to the allowable GOF range. If the GOF of the optimal spectrum is within the allowable range, the first temporary thickness is stored as the thickness of each component layer of the actual multilayer. The allowable GOF range may be set between about 0.9 and 1. If the GOF is outside of the allowable range, the first temporary thickness is not regarded as the thickness of the actual multilayer, and a second temporary thickness is obtained using the second recipe data corresponding to the second hypothetical multilayer. A large deviation from the allowable GOF range may indicate that the uppermost layer of the second silicon oxide layer 108 has been over-etched in a previous etching process, and the first recipe data may not be used to determine the thickness of the actual multilayer. Therefore, the first recipe data are replaced with the second recipe data under an assumption that the actual multilayer more closely fits the second hypothetical multilayer, in which the second silicon oxide layer 108 is no longer present, more closely than the first hypothetical multilayer. Since the process for measuring the second temporary thickness of the multilayer is the same as the process for measuring the first temporary thickness except that the first recipe data is replaced with the second recipe data, any further detailed description for measuring the second thickness will be omitted.

In a similar way of measuring the first thickness of the multilayer, the GOF of the second temporary thickness is estimated using the spectrum error between the measured spectrum and the selected theoretical spectrum. If the GOF is within the allowable GOF range, the second temporary thickness is stored as the thickness of each component layer of the actual multilayer. However, if the GOF is outside of the allowable range, the second temporary thickness is not regarded as the thickness of the actual multilayer, and a third temporary thickness with respect to the third hypothetical multilayer is obtained using the third recipe data. If the GOF is not within the allowable range, the third thickness is not accepted as the thickness of the actual multilayer, and a fourth temporary thickness in connection with the fourth hypothetical multilayer is obtained using the fourth recipe data. The GOF of the fourth thickness is similarly calculated to determine whether the GOF is within the allowable range.

When the GOF of a selected spectrum is within the allowable range, the process for measuring the thickness of the multilayer may not be performed, and the temporary thickness satisfying the GOF condition is determined as the thickness of each component layer of the actual multilayer in the first OS. When not all measured thicknesses are within the allowable range, the temporary thickness of which the GOF is most proximate to the allowable GOF range is determined as the thickness of each component layer of the actual multilayer in the first OS. The thickness of each component layer in the multilayer coated on the first OS is determined through the above-described process. In the same process, the thickness of each component layer in the multilayer coated on the second through fifth OS may also be determined, as would be known to one of the ordinary skill in the art.

Accordingly, when the etching process is not uniformly performed on the patterned wafer, the recipe data for calculating the theoretical thickness is selected in accordance with the stack structure of each OS, so that the thickness of each component layer may be accurately determined.

Third Embodiment

Elements and processes of a third embodiment of the present invention are substantially similar to those of the second embodiment of the present invention, except for a measuring sequence.

A patterned wafer, on which a multilayer is formed, is loaded into a process chamber. In an exemplary embodiment, the multilayer of the patterned wafer is supposed to be formed in the same process like the patterned wafer of the second embodiment described above. Specifically, the patterned wafer includes a first silicon nitride layer having a thickness of about 260 Å, a first silicon oxide layer having a thickness of about 750 Å, a second silicon nitride layer having a thickness of about 500 Å, and a second silicon oxide layer having a thickness of about 4500 Å sequentially stacked in that order from an upper surface of a substrate after an etching process.

Polarized light is directed onto a first OS, and reflected light reflected from the first OS is detected. The reflected light is detected and analyzed according to a wavelength thereof, and is divided into horizontal and vertical polarization components. An intensity ratio and a phase difference between the horizontal and vertical polarization components are obtained as a function of the wavelength of the polarized light. Specifically, the intensity ratio and the phase difference between the horizontal and vertical polarization components of the polarized light are distributed with respect to the wavelength of the polarized light. As a result, a first measured spectrum of the polarized light reflected from the first OS is obtained and output. Then, second through fifth measured spectra of the polarized light reflected from a second OS through a fifth OS, respectively, are separately obtained. The first through fifth measured spectra are stored into a first storing unit.

Next, a stack structure of the multilayer is expected in the same way as described in the second embodiment of the present invention, and first through fourth recipe data are preset to correspond to the first through fourth hypothetical multilayers, respectively. In the present embodiment, first through fifth OS points are selected corresponding to top, central, bottom, left and right portions of the patterned wafer.

A plurality of first theoretical spectra is obtained using first recipe data according to a theoretical equation. Specifically, refractive indices and extinction coefficients of each component layer of the first hypothetical multilayer, which are already set in the first recipe data, are used in the theoretical equation, and the first theoretical spectrum is obtained in conformity with the wavelength of light on a condition that the theoretical thickness of each layer is fixed. The first theoretical spectrum is repeatedly obtained with varying theoretical thicknesses of each layer within a predetermined range, thus a plurality of first theoretical spectra is formed. The thickness of the multilayer may be selected within an allowable marginal range of the thickness of each component layer. A plurality of first theoretical spectra is stored in accordance with the thickness of the first hypothetical multilayer.

The measured spectrum measured at the first OS is compared with a plurality of first theoretical spectra calculated using first recipe data corresponding to a first hypothetical multilayer, and one of the first theoretical spectra having the least amount of spectrum error is selected as a first optimal spectrum that most closely fits the measured spectrum. As a result, the thickness of the multilayer with respect to the optimal spectrum is regarded as a first temporary thickness of the actual multilayer at the first OS. In the same way, the first temporary thickness of the actual multilayer at the second through fifth OS points are also respectively determined.

Then, each GOF of the first temporary thickness on the first through fifth OS points are estimated. Each of the first temporary thickness of which GOF is within the allowable range is regarded and output as the actual thickness of the multilayer coated on the corresponding OS point. However, the first temporary thickness of which GOF is outside of the allowable range is not regarded as the actual thickness of the multilayer on the corresponding OS point.

When the GOF of the first temporary thickness is outside of the allowable range at a particular OS, a plurality of second theoretical spectra is obtained using the second recipe data to correspond to a second hypothetical multilayer, and the measured spectrum on the particular OS is compared with a plurality of second theoretical spectra. If the GOF of the first temporary thickness is not within the allowable range at the first OS, a plurality of second theoretical spectra is compared with the measured spectrum of the first OS. The thickness with respect to the second theoretical spectrum having the least amount of spectrum error is stored as a second temporary thickness of the actual multilayer on the first OS. When the GOF of the second temporary thickness is not within the allowable range, a third and fourth temporary thickness of the actual multilayer are repeatedly measured based on the third and fourth recipe data characterizing the third and fourth hypothetical multilayers, respectively. The GOF of the third and fourth temporary thicknesses are continuously checked to determine whether each GOF of the third and fourth temporary thickness is within the allowable range.

When all the GOF values of the temporary thickness are within the allowable range at all of the first through fifth OS points, each of the temporary thicknesses satisfying the GOF condition is selected as an actual thickness of each component layer in the multilayer, and the measuring process for measuring the thickness of the multilayer is not needed. When not all of the GOF are within the allowable range, even though all the recipe data have been used for calculating the temporary thickness, the temporary thickness of which the GOF is most proximate to the allowable GOF range is selected as the thickness of the actual multilayer.

Accordingly, each thickness of the multilayer coated on the first through fifth OS points, respectively, is accurately measured through the above-described process. In addition, when the etching process is not performed uniformly on the patterned wafer, the recipe data for calculating the theoretical thickness is selected in accordance with the stack structure of each OS, so that the thickness of each component layer may be accurately determined.

The thickness of the multilayer coated on the patterned wafer was experimentally measured at each OS point by the above-described process under the following conditions:

| Testing sample | A patterned wafer after etching a pad thereof |
|---|---|
| Measuring instrument | Spectroscopic Ellipsometry (SE) |
| Number of measuring points | 6 |
| Number of layers in a hypothetical multilayer coated at each OS point | 3 |
| A first hypothetical multilayer | A first silicon nitride layer, silicon oxide layer, and a second silicon nitride layer |
| A second hypothetical multilayer | A first silicon nitride layer, silicon oxide layer |
| A third hypothetical multilayer | A first silicon nitride layer |
| Recipe data | Three different recipe data corresponding to the first through third hypothetical multilayers, respectively. |

FIG. 5 illustrates a view of a wafer map indicating a plurality of measuring points. Three kinds of measuring groups are selected on the wafer, and each group includes two measuring points adjacent to each other. In FIG. 5, the reference numerals, 200a through 200f, denote first through sixth measuring points on the wafer, respectively, and the measuring process is performed at a corresponding OS formed at each measuring point.

Figure 6:
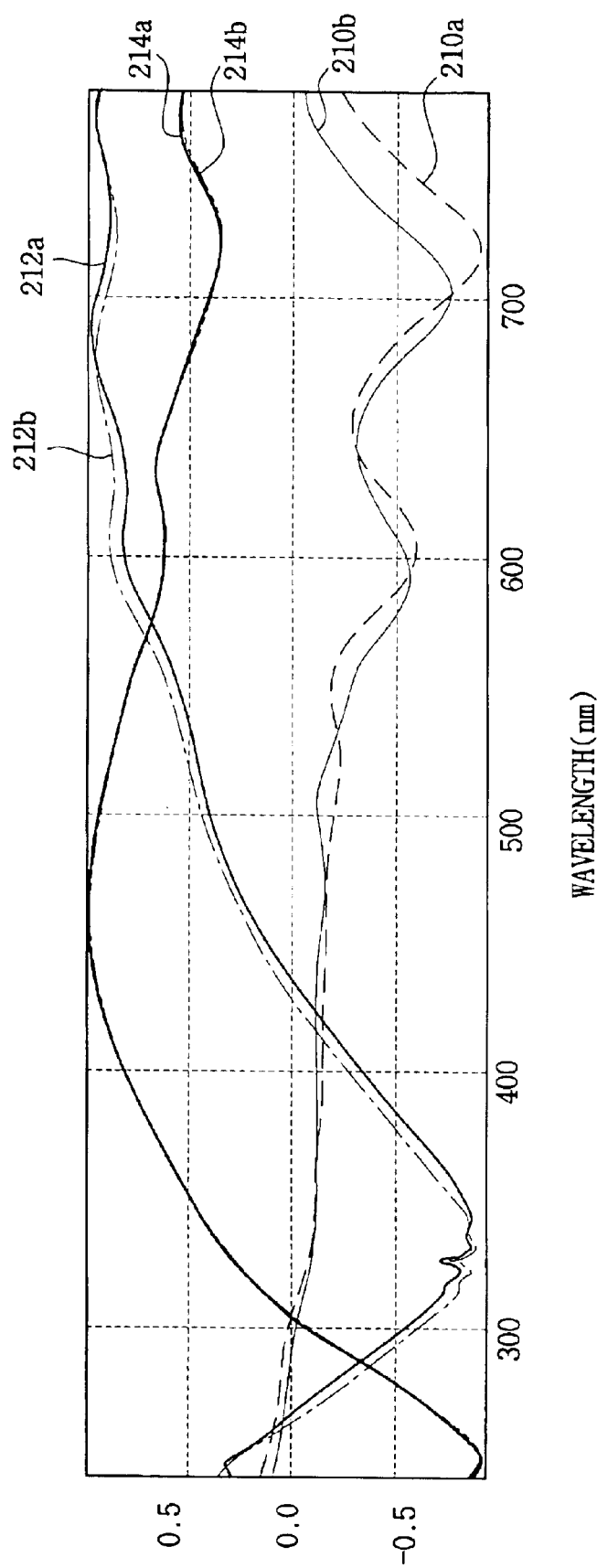
FIG. 6 is graph illustrating an intensity of light with respect to wavelength.
Figure 7:
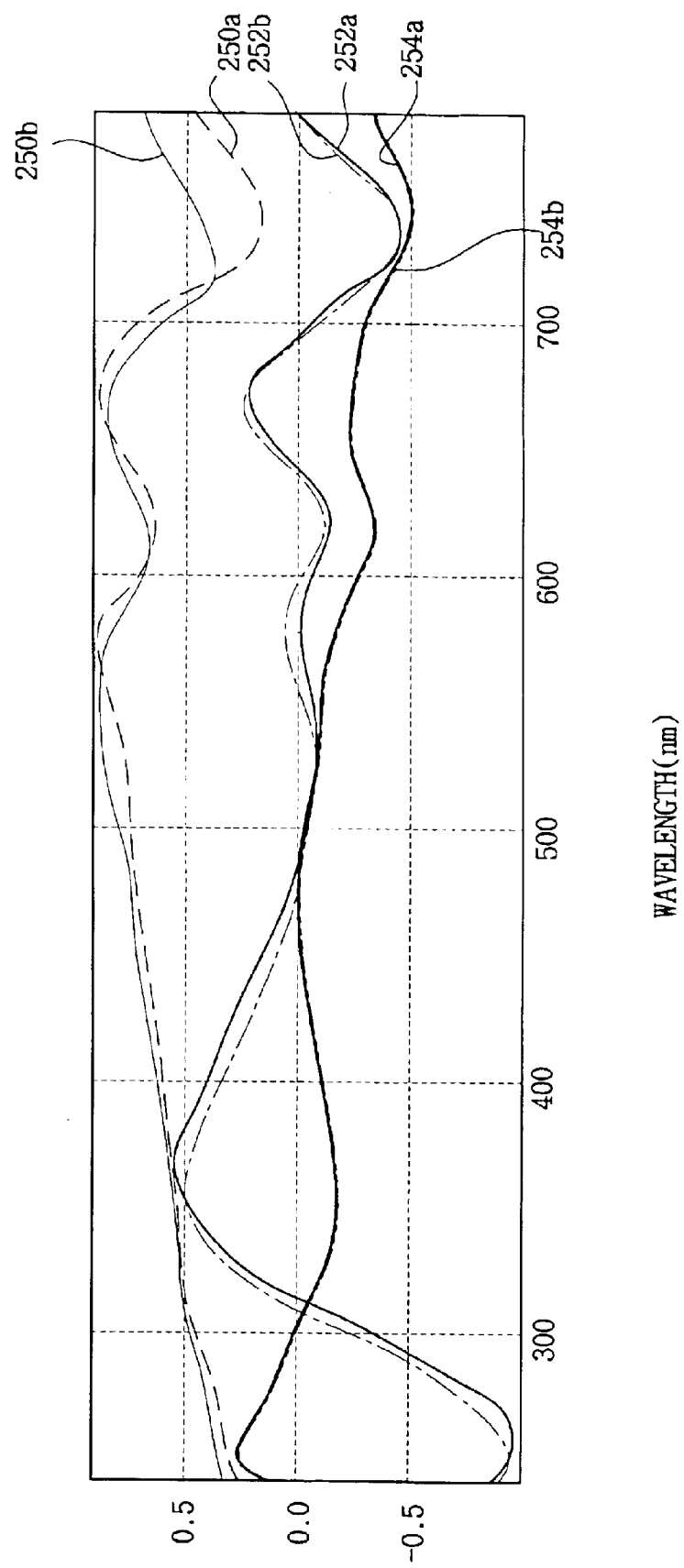
FIG. 7 is a graph illustrating a phase shift of light with respect to wavelength.

FIG. 6 is graph illustrating an intensity of light with respect to wavelength. FIG. 7 is a graph illustrating a phase shift of light with respect to wavelength. The light intensity and the phase shift were measured at each measuring point. In FIG. 6, the curves denoted by reference numerals 210a and 210b, respectively, indicate the intensity change at the first and second OS points. The curves denoted by reference numerals 212a and 212b, respectively, indicate the intensity change at the third and fourth OS points. The curves denoted by reference numerals 214a and 214b, respectively, indicate the intensity change at the fifth and sixth OS points.

In FIG. 7, the curves denoted by reference numerals 250a and 250b, respectively, indicate the phase change at the first and second OS points. The curves denoted by reference numerals 252a and 252b, respectively, indicate the phase change at the third and fourth OS points. The curves denoted by reference numerals 254a and 254b, respectively, indicate the phase change at the fifth and sixth OS points. Hereinafter, the graph shown in FIG. 6 is referred to as SE α and the graph shown in FIG. 7 is referred to as SE β.

Referring to FIGS. 6 and 7, when the measuring points were adjacent to each other and were in a same measuring group, a shape of the SE α is very similar to a shape of the SE β, so that the SE α and the SE β may approximately overlap each other if shifted along a vertical or horizontal direction in the graph. However, when the measuring points were separated from each other and were not in the same measuring group, the shape of the SE α is completely different from the shape of the SE β. The similarity between the SE α and the SE β indicates that the multilayers coated on the adjacent measuring points were alike in stack structure, and the difference between the SE α and the SE β indicates that the multilayers coated on the separated measuring points are completely different from each other in stack structure due to, e.g., an evenness failure of the patterned wafer.

The thickness of the multilayer was measured at the above six measuring points of the wafer using the first recipe data corresponding to the first hypothetical multilayer, and the GOF values of the thickness of each component layer were calculated, respectively, and the results are shown in Table 1.

TABLE 1

| | Thickness of the first silicon nitride layer | Thickness of the silicon oxide layer | Thickness of the second silicon nitride layer | Sum of the thickness | GOF value |
|---|---|---|---|---|---|
| 1st point | 76.62 | 524.12 | 682.24 | 1285.98 | 0.000 |
| 2nd point | 329.93 | 163.63 | 670.50 | 1164.07 | 0.000 |
| 3rd point | 228.53 | 1070.20 | 133.81 | 1432.54 | 0.993 |
| 4th point | 234.61 | 1063.05 | 110.23 | 1408.19 | 0.993 |
| 5th point | 287.09 | 751.16 | 0 | 1038.25 | 0.994 |
| 6th point | 287.80 | 744.48 | 0 | 1032.28 | 0.994 |

Referring to Table 1, the GOF of the thickness at the third through sixth measuring points is greater than 0.9, however, the GOF of the thickness at the first and second measuring points is 0. Therefore, the thickness measured at the first and second measuring points is not completely reliable for the actual thickness of the multilayer coated at the first and second points on the patterned wafer. In addition, the thickness of the second silicon nitride layer is measured as zero (0) at the fifth and sixth measuring points. The results shown in Table 1 indicate that the thickness of each component layer in the multilayer is somewhat accurate though the first recipe data is used for calculating the thickness when the stack structure of the actual multilayer is the same as that of the first hypothetical multilayer from which only the uppermost layer is removed.

Then, the thickness of the multilayer was repeatedly measured at the first and second measuring points using the second recipe data corresponding to the second hypothetical multilayer since the GOF of the thickness was not within the allowable range. The GOF values of the re-measured thickness each component layer were calculated, respectively, and the results are shown in Table 2.

TABLE 2

| | Thickness of the first silicon nitride layer | Thickness of the silicon oxide layer | Sum of the thickness | GOF value |
|---|---|---|---|---|
| 1st point | 81.36 | 0.00 | 81.36 | 0.994 |
| 2nd point | 78.89 | 0.00 | 78.89 | 0.994 |

Then, all of the thicknesses having a GOF value greater than 0.9 are output, as shown in Table 3.

TABLE 3

| | Thickness of the first silicon nitride layer | Thickness of the silicon oxide layer | Thickness of the second silicon nitride layer | Sum of the thickness | GOF value |
|---|---|---|---|---|---|
| 1st point | 81.36 | 0.00 | — | 81.36 | 0.994 |
| 2nd point | 78.89 | 0.00 | — | 78.89 | 0.994 |
| 3rd point | 228.53 | 1070.20 | 133.81 | 1432.54 | 0.993 |
| 4th point | 234.61 | 1063.05 | 110.23 | 1408.19 | 0.993 |
| 5th point | 287.09 | 751.16 | 0 | 1038.25 | 0.994 |
| 6th point | 287.80 | 744.48 | 0 | 1032.28 | 0.994 |

Referring to Table 3, the actual multilayer coated at the first and second points only includes the first silicon nitride layer without the second silicon nitride layer and the silicon oxide layer, and the actual multilayer coated at the third and fourth points includes all of the first silicon nitride layer, the second silicon nitride layer and the silicon oxide layer. In addition, the actual multilayer coated at the fifth and sixth points includes only the first silicon nitride layer and the silicon oxide layer without the second silicon nitride layer.

Therefore, even though the stack structure of the multilayer is different at every section of the patterned wafer due to, e.g., a non-uniform etching process, the thickness of each component of the multilayer may be accurately measured with a reliability of a GOF greater than 0.9.

According to the present invention, the thickness of each component layer in the multilayer may be measured without directly contacting the wafer, not by using a monitoring wafer, but by using the patterned wafer, thereby reducing the fabricating cost of the semiconductor device. In addition, even though the stack structure of the multilayer may be different in every section of the patterned wafer, a thickness of each component of the multilayer may be accurately measured with a high reliability.

Exemplary embodiments of the present invention have been disclosed herein and, although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. An apparatus for measuring a thickness of a multilayer on a substrate, comprising:

a measuring unit for measuring reflected light to generate a measured spectrum of the reflected light, the reflected light being reflected from the substrate on which the multilayer is formed;

an input unit for inputting a plurality of recipe data, each of the plurality of recipe data corresponding to one of a plurality of hypothetical multilayers, one of the hypothetical multilayers being initially assumed as the multilayer actually formed on the substrate;

a first storing unit for storing the measured data;

a second storing unit for storing the plurality of recipe data;

an output unit for outputting a thickness of the multilayer on the substrate; and a control unit connected to the measuring unit, the input unit, the first and second storing units and the output unit, wherein the control unit calculates a plurality of theoretical spectra, each of which indicates at least a thickness of each component layer of the hypothetical multilayer assumed to be the multilayer actually formed on the substrate, using one of the plurality of recipe data, compares the measured spectrum with the plurality of theoretical spectra, thereby determining a temporary thickness of the multilayer, estimates whether a reliability of the temporary thickness is within an allowable range, and transfers the temporary thickness to the output unit when the reliability is within the allowable range or repeats the selection of the temporary thickness after changing the recipe data when the reliability is outside of the allowable range.

2. The apparatus as claimed in claim 1, wherein the measuring unit comprises:

a loading part for loading the substrate;

a light source for generating source light;

a polarizer for polarizing the source light, so that polarized light is directed onto the substrate and reflected from the substrate; and an analyzer for analyzing the reflected light for measuring the data to generate the measured spectrum.

3. The apparatus as claimed in claim 2, wherein the measuring unit further comprises:

a prism for dividing the reflected light from the analyzer into horizontal and vertical polarization components; and a detector receiving the horizontal and vertical polarization components and outputting intensities thereof, which provide an intensity ratio and a phase difference between the horizontal and vertical polarization components in accordance with a wavelength of the reflected light.

4. The apparatus as claimed in claim 1, wherein the control unit selects one of the plurality of theoretical spectra having a least amount of spectrum error, and determines a theoretical thickness that is used in calculating the theoretical spectrum as the temporary thickness, wherein the spectrum error is a difference between the measured spectrum and the theoretical spectrum.

5. The apparatus as claimed in claim 4, wherein the reliability of the temporary thickness comprises a number indicating a magnitude of the spectrum error.

6. The apparatus as claimed in claim 1, wherein each of the plurality of recipe data comprises a stack order of each component layer of the corresponding hypothetical multilayer, a stack number of each component layer of the hypothetical multilayer, and physical information on each component layer.

7. The apparatus as claimed in claim 6, wherein the physical information of each component layer comprises a refractive index and an extinction coefficient of each component layer.

8. A method of measuring a thickness of a multilayer on a substrate, comprising:

measuring a spectrum of reflected light, the reflected light being reflected from the substrate on which the multilayer is formed, after directing source light onto the substrate;

storing a plurality of recipe data, each corresponding to one of a plurality of hypothetical multilayers, wherein one of the plurality of hypothetical multilayers is initially assumed to be the multilayer actually formed on the substrate;

calculating a plurality of theoretical spectra using one of the plurality of recipe data in accordance with various theoretical thicknesses of one of the plurality of hypothetical multilayers;

comparing the measured spectrum with the plurality of theoretical spectra to determine a temporary thickness of the multilayer;

estimating a reliability of the temporary thickness of the multilayer; and outputting the temporary thickness as a thickness of the multilayer on the substrate when the reliability of the temporary thickness is within an allowable range.

9. The method as claimed in claim 8, wherein calculating a plurality of theoretical spectra using another one of the plurality of recipe data, comparing the measured spectrum with the plurality of theoretical spectra, and estimating a reliability of the temporary thickness of the multilayer are sequentially repeated when the reliability of the temporary thickness is outside of the allowable range.

10. The method as claimed in claim 9, wherein when the reliability of the temporary thickness is outside of the allowable range and all of the plurality of recipe data have been used, the temporary thickness having the greatest reliability is output as the thickness of the multilayer on the substrate.

11. The method as claimed in claim 8, wherein one of the plurality of hypothetical multilayers is a standard multilayer that is stacked in accordance with a designed sequential order.

12. The method as claimed in claim 11, wherein the plurality of theoretical spectra is initially calculated using the recipe data corresponding to the standard multilayer.

13. The method as claimed in claim 11, wherein another one of the plurality of hypothetical multilayers is determined sequentially whenever an uppermost component layer is removed from the standard multilayer.

14. The method as claimed in claim 11, wherein another one of the plurality of hypothetical multilayers is determined sequentially whenever an additional layer is formed on the standard multilayer.

15. The method as claimed in claim 8, wherein each of the plurality of recipe data comprises a stack order of each component layer of the corresponding hypothetical multilayer, a stack number of each component layer of the hypothetical multilayer, and physical information on each component layer.

16. The method as claimed in claim 15, wherein the physical information of each component layer comprises a refractive index and an extinction coefficient of each component layer.

17. The method as claimed in claim 8, wherein the source light outputs polarized light, and further comprising dividing the reflected light into horizontal and vertical polarization components, and determining an intensity ratio and a phase difference between the horizontal and vertical polarization components in accordance with a wavelength of the reflected light.

18. The method as claimed in claim 8, wherein an optimal spectrum having a least amount of spectrum error is selected from among the plurality of theoretical spectra, and a thickness with respect to the optimal spectrum is determined as the temporary thickness of the multilayer on the substrate, wherein the spectrum error is a difference between the measured spectrum and the theoretical spectrum.

19. The method as claimed in claim 18, wherein the reliability of the temporary thickness is expressed as a number indicating a magnitude of the spectrum error.

20. The method as claimed in claim 8, wherein the substrate comprises a patterned wafer on which semiconductor processing is performed.

21. The method as claimed in claim 20, wherein measuring a spectrum of the reflected light is performed on an oxide site (OS) formed in a scribe line of the patterned wafer.

22. The method as claimed in claim 8, wherein measuring a spectrum of the reflected light is sequentially performed at a plurality of measuring points on the substrate.

23. A method of measuring a thickness of a multilayer on a patterned wafer, comprising:

measuring a plurality of spectra of reflected light at a plurality of measuring points on the patterned wafer, the reflected light being reflected from each of the plurality of measuring points on the patterned wafer on which the multilayer is formed, after directing source light onto the plurality of measuring points;

storing a plurality of recipe data, each corresponding to one of a plurality of hypothetical multilayers, wherein one of the plurality of hypothetical multilayers is initially assumed to be the multilayer actually formed on the patterned wafer;

calculating a plurality of theoretical spectra using one of the plurality of recipe data in accordance with various theoretical thicknesses of one of the hypothetical multilayers;

comparing each of the plurality of measured spectra with the plurality of theoretical spectra to determine a plurality of temporary thickness of the multilayer at each measuring point;

estimating a reliability of each of the plurality of temporary thicknesses of the multilayer; and outputting the plurality of temporary thicknesses as actual thicknesses of the multilayer at each of the plurality of measuring points when the reliability of the temporary thickness is within an allowable range.

24. The method as claimed in claim 23, wherein calculating a plurality of theoretical spectra using another one of the plurality of recipe data, comparing each of the plurality of measured spectra with the plurality of theoretical spectra, and estimating a reliability of each of the temporary thicknesses of the multilayer are subsequently repeated at each measuring point having a reliability of the temporary thickness outside of the allowable range.

25. The method as claimed in claim 24, wherein when the reliability of the temporary thickness is outside of the allowable range and all of the plurality of recipe data have been used, the temporary thickness having the greatest reliability is output as an actual thickness of the multilayer at each of the plurality of measuring points.

26. The method as claimed in claim 23, wherein one of the plurality of hypothetical multilayers is a standard multilayer that is stacked in accordance with a designed sequential order.

27. The method as claimed in claim 23, wherein the plurality of theoretical spectra is initially calculated using the recipe data corresponding to the standard multilayer.

28. The method as claimed in claim 23, wherein another one of the plurality of hypothetical multilayers is determined sequentially whenever an uppermost component layer is removed from the standard multilayer.

29. The method as claimed in claim 23, wherein another one of the plurality of hypothetical multilayers is determined sequentially whenever an additional layer is formed on the standard multilayer.

* * * * *